No. 716,094. Patented Dec. 16, 1902.
J. A. PEOPLES.
WABBLING SAW.
(Application filed Feb. 4, 1902.)
(No Model.)
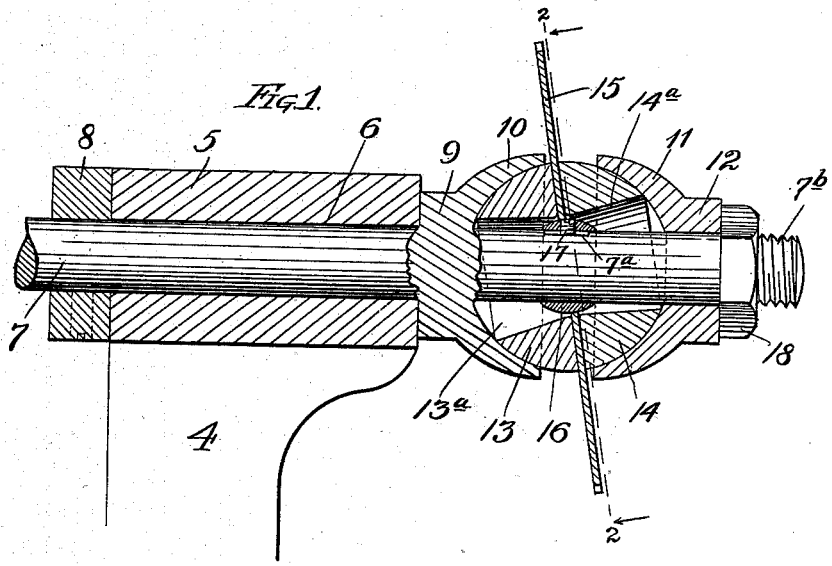
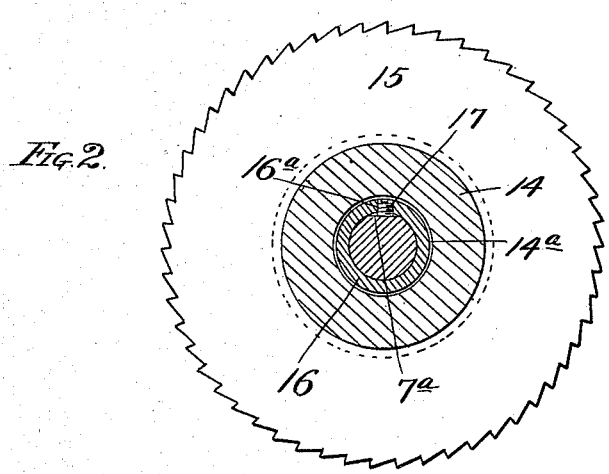
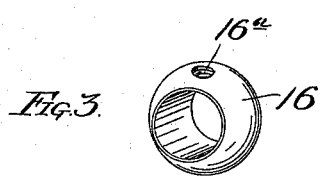
WITNESSES:
F. B. Townsend,
Ada H. Pond.
INVENTOR.
James A. Peoples,
BY Samuel N. Pond.
ATTORNEY.

UNITED STATES PATENT OFFICE.

JAMES A. PEOPLES, OF CHICAGO, ILLINOIS.

WABBLING SAW.

SPECIFICATION forming part of Letters Patent No. 716,094, dated December 16, 1902.

Application filed February 4, 1902. Serial No. 92,498. (No model.)

*To all whom it may concern:*

Be it known that I, JAMES A. PEOPLES, a citizen of the United States, residing at Chicago, in the county of Cook and State of Illinois, have invented certain new and useful Improvements in Wabbling Saws, of which the following is a specification.

My invention relates to that class of rotary saws known as "wabbling saws," wherein the saw-disk is mounted and secured on its driving shaft or arbor by means which permit an adjustment of the saw-disk out of a plane normal to the shaft, so that it occupies a more or less inclined position relatively to the latter, and thereby is rendered capable of cutting a groove considerably wider than the thickness of the saw itself.

The primary object of my invention is to provide a head or chuck for clamping and holding the saw which shall be capable of universal adjustment to permit the saw to be universally adjusted and set in any inclined plane relatively to its shaft within such limits of angular variation as are found to be practicable.

A further object of my invention is to provide a head or chuck of this character which shall clamp and hold the saw with greater rigidity and security than any devices of this nature with which I am acquainted.

A still further object of the invention is to provide a device on the shaft itself which shall afford a perfect axial bearing and seat for the central aperture of the saw-disk in any and all adjusted positions of the latter.

Other minor objects of my invention will appear later in the subjoined detailed description of the embodiment which I have here chosen to illustrate the same.

To these ends my invention consists in a universally-adjustable head or chuck for a rotary saw of the wabbling type having the general characteristics of structure and relative disposition of elements, substantially as hereinafter described, and more particularly defined in the appended claims.

A preferred embodiment of the mechanical principle of my invention is illustrated in the accompanying drawings, in which—

Figure 1 is an elevation, partly in central vertical section, of a saw head or chuck and support therefor constructed in accordance with my invention. Fig. 2 is a transverse section of the same on the line 2 2 of Fig. 1 looking in the direction indicated by the arrows, and Fig. 3 is a detail in perspective of a spherical bearing-ring which serves as an axial seat for the saw-disk and constitutes an important element of my invention.

Referring to the drawings for a detailed description, 4 indicates an upright support, the head-block 5 of which is horizontally bored to form an extended journal-bearing 6 for a driving shaft or arbor 7. The shaft may be conveniently retained longitudinally in its bearing by an adjustable collar 8, abutting one end of the bearing-block 5, while a collar 9, integral with or fast on the shaft, similarly abuts the opposite end of the bearing-block. The collar 9 is outwardly and longitudinally extended to form a cup-shaped receptacle 10, constituting the fixed element of the clamp, the companion element of which is constituted by a correspondingly cup-shaped receptacle 11, which has a short sleeved extension 12 and is longitudinally slidable on and over the outer free end of the shaft 7. The hollowed-out or concave faces of the cups 10 and 11 oppose each other, as shown, and in the preferred construction of these elements they are formed with their concave clamping-faces having the contour of zones of a perfect sphere.

13 and 14 designate, respectively, a pair of saw-clamping collars, which in the form herein shown comprise, essentially, a pair of solid hemispheres having their outer convex surfaces rounded to universally fit and contact the opposed concave faces of the cups 10 and 11, respectively, while their proximate flat faces are adapted to squarely contact and abut the opposite faces of a saw-disk, (indicated at 15.) The collars 13 and 14 are provided with outwardly and oppositely flaring frusto-conical bores $13^a$ and $14^a$, respectively, the inner contracted ends of which meet on opposite sides of the saw-disk and are made of a diameter somewhat exceeding the diameter of the driving-shaft, for a purpose next to be described.

16 designates a ring or collar, which is formed to have a snug sliding fit on the shaft 7 and possesses as its chief distinguishing characteristic an outer convex surface which constitutes a central section of a perfect sphere. This ring is rendered adjustable within a certain limited travel on the shaft by means of a set-screw 17, threading through a radial hole 16ᵃ in the ring and abutting a flattened surface 7ᵃ on the shaft. It will be observed that the set-screw is formed without a head, so that when screwed home to securely bind the ring on the shaft its outer convex end will lie perfectly flush with or slightly below the convex face of the ring itself. The extreme outer end of the shaft 7 is externally threaded, as indicated at 7ᵇ, and receives thereon a clamp-nut 18.

In assembling the several elements hereinabove described into coöperative relation for the purposes of a universal wabbling-saw head, the shaft 7, carrying the cup 10, being journaled in its bearing, the ring 16 may be slipped over the free end of the shaft and clamped into approximately true position to constitute an axial bearing for the saw 15. The clamping-collar 13 is next introduced over the end of the shaft and is snugly seated within its receiving-cup 10, when the inner contracted end of its axial frusto-conical bore will loosely overlie the convex surface of the ring 16. The saw-disk 15 is next put in place, with the inner face thereof squarely seating against the opposed flat face of the collar 13. In such position of the saw-disk the ring 16 should occupy such a position on the shaft that the central plane of the disk will coincide with a plane of the ring 16 passing through the geometrical center of the latter. This insures the snug seating of the saw-disk upon the convex surface of the ring 16 in the line of the central or maximum diameter of said ring at all positions to which the disk may be adjusted relatively to the ring. If the saw-disk when put in place does not thus perfectly coincide with the maximum or central diameter of the ring, the latter is adjusted longitudinally of the shaft by means of its set-screw 17 until such coincidence and perfect seating of the saw-disk are secured. The companion clamping-collar 14 is next applied, its flat face being carried hard against the opposing outer face of the saw-disk, whereupon the cup 11 is then applied, and the several elements are forced longitudinally into close frictional contact by the application and tightening up of the nut 18.

An important feature of my invention resides in the peculiar construction of the cups 10 11 and the coöperating hemispherical clamping-collars 13 14, wherein the contacting and frictionally-engaging surfaces of these elements are afforded a maximum extent of frictional coöperating areas by forming them on the lines of true spheres. The clamping-collars 13 and 14 are substantially complete hemispheres, and the coöperating holding-cups 10 and 11 for the same are substantially halves of an enveloping hollow sphere minus a narrow intermediate zone lying between their inner proximate faces within which the angular adjustments of the saw-disk and its supporting-collars are effected.

The ring 16, with its convex outer surface formed as a central zone of a perfect sphere, serves an important function in affording a snug seat for the central opening of the saw-disk in all adjusted positions of the latter. In many prior devices of this general character with which I am acquainted not only have other clamping means having frictional contact-surfaces of less area in proportion to the diameter of the clamps been employed to form the head or chuck, but the saw-disk itself has been mounted directly upon the cylindrical surface of the arbor, and in order to provide for the necessary tilt or inclination of the saw to produce the wabbling effect it has obviously been necessary to equip the disk with an opening of a diameter somewhat in excess of the diameter of the arbor. This has destroyed the snug fit of the saw upon its axial seat and hence has thrown upon the clamping-faces the entire burden of maintaining the saw-disk always axially coincident with the axis of the arbor, while my invention by providing a firm and independent seat for the saw-disk at its central opening upon an axial support therein in all positions of the saw entirely relieves the clamping-faces of the burden of resisting all radial forces tending to throw the saw off center relatively to the shaft, and thus entirely obviates the fault above referred to.

It will be observed that the cups 10 and 11 and the clamping-collars 13 and 14 are of substantially the same diameter, and, further, that the inner annular face of the cup 11 is in a plane normal to the saw-shaft. This construction is of importance in facilitating a quick adjustment of the saw from an inclined position on the shaft to a position normal thereto when it is not desired to make a cut exceeding the thickness of the saw itself. To effect such adjustment of the saw, it is necessary only to withdraw the nut 18, cup 11, and collar 14 and then replace the cup 11 on the shaft and force the latter hard against the proximate face of the saw by means of the nut 18, entirely omitting the collar 14. In this operation the annular face of the cup 11, which is always normal to the shaft, automatically forces the saw and the flat face of the collar 13 on the opposite side of the saw also into planes normal to the shaft, and by reason of the fact that the diameter of the cup 11 is equal or substantially equal to the diameter of the collar 13 on the opposite side of the saw the latter is securely clamped between the opposing faces of said cup and collar without any danger or possibility of dishing the saw-disk such as would result were the bearing-faces of the clamping parts of unequal dimensions.

My invention will obviously accommodate saws of varying diameters and thickness. Where saws of varying thickness are successively used in order to obtain the best results in the way of the most perfect and exact centering of the saw on the shaft, the ring 16 should be adjusted, as above described, so as to bring the central plane of the particular saw applied in each case into coincidence with a central plane of the sphere of which the ring constitutes a central section or zone. By observing this relative adjustment of the saw and ring in each case a seat of the saw upon the ring can be secured wherein the clamping-collars and cups will be entirely relieved of the strain of resisting radial thrusts upon the disk and will find their whole service in frictionally clamping the saw against the tendency to backward rotation on the shaft due to the resistance of the material operated upon.

It is evident that various modifications both as to construction and relative arrangement of the several elements constituting my invention might be made without departing from the principle and spirit thereof. I do not, therefore, limit myself to the particular embodiment of my invention as herein shown, this illustration showing merely the preferred form in which I have chosen to express my invention. So far as I am aware I am the first to provide a head or chuck so constructed as to afford the greatest area of frictional contacting surfaces between the interclamping members that is geometrically possible relatively to the diameter of the clamps. I believe I am also the first to provide a spherical axial seat for the saw-disk on its arbor, which insures a snug fit of the disk in any and all of its adjusted positions, with the beneficial results hereinbefore explained. This spherical bearing might obviously be made an integral part of the shaft itself, if desired. I do not, therefore, limit my invention in this respect to the separable and adjustable ring shown and described.

Having thus described my invention and illustrated the preferred form thereof, what I claim as new, and desire to secure by Letters Patent, is—

1. In a wabbling-saw head, the combination with the saw-shaft, of a pair of substantially hemispherical saw-clamping collars provided with outwardly and oppositely flaring frustoconical axial bores, a clamp therefor comprising a pair of cup-shaped receptacles spherically concaved to seat and contact substantially the entire convex hemispherical faces of said clamping-collars, and means for clamping said parts together on the shaft, the saw and its collars being capable of universal adjustment relatively to each other and the shaft and being held in adjusted position solely by the frictional contact of the cup-shaped clamps, substantially as described.

2. In a wabbling-saw head, the combination with the saw-shaft, of a pair of substantially hemispherical saw-clamping collars provided with outwardly and oppositely flaring frustoconical axial bores, a cup fast on the shaft spherically concaved to seat and contact substantially the entire convex hemispherical face of one of said collars, a companion cup slidable on the shaft and similarly engaging the other of said collars, said cup being of approximately the same diameter as said collars and having an inner annular face normal to the shaft, and a nut on the shaft serving to clamp said parts together, whereby the saw and its collars are capable of universal adjustment relatively to each other and the shaft and are held in adjusted position solely by frictional contact, and whereby also the saw may be quickly adjusted from oblique to normal position on the shaft by omitting one of said collars, substantially as described.

3. In a device of the character described, the combination with the saw-shaft, of a pair of conically-bored saw-clamping collars having convex outer surfaces, a ring on the shaft having a convex periphery forming a universal axial seat for the saw-disk, a pair of clamping-cups mounted on the shaft outside of said collars, said cups being concaved to fit over and frictionally engage the convex outer surfaces of said collars, and a nut for forcing said parts into rigid frictional engagement longitudinally of the shaft, substantially as described.

4. In a device of the character described, the combination with the saw-shaft, of a pair of conically-bored saw-clamping collars having convex rounded outer surfaces, a ring on the shaft having a convex rounded periphery formed as a central section of a sphere and constituting a universal axial seat for the saw-disk, a pair of collar-retaining cups mounted on the shaft outside of said collars and frictionally engaging the rounded surfaces of the latter, and clamping means for said parts threaded on the shaft, substantially as described.

5. The combination with the shaft, of the conically-bored hemispherical saw-clamping collars mounted thereon, the spherically-concaved cup fast on the shaft and frictionally engaging the adjacent collar, the similarly-formed companion cup slidable on the shaft and similarly engaging its adjacent collar, the spherically-convexed ring adjustably mounted on the shaft and constituting a universal axial seat for the saw-disk, the saw-disk mounted on said ring and laterally supported by said collars, and the nut threaded on the outer end of the shaft and binding said parts in interclamped relation, substantially as described.

JAMES A. PEOPLES.

Witnesses:
I. E. DYER,
H. W. MONS.